US 11,232,279 B2

(12) United States Patent
Wang et al.

(10) Patent No.: US 11,232,279 B2
(45) Date of Patent: Jan. 25, 2022

(54) TEXTURE RECOGNITION DEVICE AND OPERATION METHOD OF TEXTURE RECOGNITION DEVICE

(71) Applicant: BOE TECHNOLOGY GROUP CO., LTD., Beijing (CN)

(72) Inventors: Haisheng Wang, Beijing (CN); Xue Dong, Beijing (CN); Yingming Liu, Beijing (CN); Xiaoliang Ding, Beijing (CN); Lei Wang, Beijing (CN); Changfeng Li, Beijing (CN); Yapeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 50 days.

(21) Appl. No.: 16/648,628

(22) PCT Filed: Sep. 30, 2019

(86) PCT No.: PCT/CN2019/109436
§ 371 (c)(1),
(2) Date: Mar. 18, 2020

(87) PCT Pub. No.: WO2020/134298
PCT Pub. Date: Jul. 2, 2020

(65) Prior Publication Data
US 2021/0248349 A1    Aug. 12, 2021

(30) Foreign Application Priority Data
Dec. 28, 2018 (CN) .......... 201811626371.5

(51) Int. Cl.
*G06K 9/00* (2006.01)
*G06K 9/20* (2006.01)

(52) U.S. Cl.
CPC ....... *G06K 9/00067* (2013.01); *G06K 9/0004* (2013.01); *G06K 9/209* (2013.01); *G06K 9/2027* (2013.01); *G06K 2209/013* (2013.01)

(58) Field of Classification Search
CPC .. G06K 9/00067; G06K 9/209; G06K 9/0004; G06K 9/2027; G06K 2209/013
See application file for complete search history.

(56) References Cited

U.S. PATENT DOCUMENTS 10,361,255 B2    7/2019 Zeng et al.
2015/0371074 A1  12/2015 Lin
(Continued)

FOREIGN PATENT DOCUMENTS

| CN | 107093617 A | 6/2017 |
| CN | 107230698 A | 10/2017 |
| CN | 108090467 A | 5/2018 |

*Primary Examiner* — Edward F Urban
*Assistant Examiner* — Wassim Mahrouka

(57) ABSTRACT

A texture recognition device and an operation method of a texture recognition device are provided. The texture recognition device includes a light source array and an image sensor array. The light source array includes a plurality of light sources; the image sensor array is at a side of the light source array and includes a plurality of image sensors, and the plurality of image sensors are configured to receive light emitted from the plurality of light sources and reflected to the image sensors by a texture for a texture image collection; each of the image sensors includes a plurality of signal switches, and a signal of each of the image sensors is read through the plurality of signal switches for forming one image pixel of the texture image.

21 Claims, 7 Drawing Sheets

(56) References Cited

U.S. PATENT DOCUMENTS

2016/0266695 A1* 9/2016 Bae .................... G06F 3/04166
2021/0103714 A1* 4/2021 Li ....................... G06K 9/0004

* cited by examiner

TEXTURE RECOGNITION DEVICE AND OPERATION METHOD OF TEXTURE RECOGNITION DEVICE

The application claims priority to the Chinese patent application No. 201811626371.5, filed on Dec. 28, 2018, the entire disclosure of the aforementioned application is incorporated by reference as part of the disclosure of this application.

TECHNICAL FIELD

Embodiments of the present disclosure relate to a texture recognition device and an operation method of a texture recognition device.

BACKGROUND

With increasing popularity of mobile terminals, more and more users use mobile terminals to perform operations such as identity verification, electronic payment and so on. Because of the uniqueness of skin textures such as fingerprint patterns or palm print patterns, fingerprint identification technology combined with optical imaging is gradually adopted by mobile electronic devices for identity verification, electronic payment, etc. How to design a more optimized display panel structure is a focus problem in the art.

SUMMARY

At least one embodiment of the present disclosure provides a texture recognition device, and the texture recognition device comprises a light source array and an image sensor array. The light source array comprises a plurality of light sources; the image sensor array is at a side of the light source array and comprises a plurality of image sensors, and the plurality of image sensors are configured to receive light emitted from the plurality of light sources and reflected to the image sensors by a texture for a texture image collection; each of the image sensors comprises a plurality of signal switches, and a signal of each of the image sensors is read through the plurality of signal switches for forming one image pixel of the texture image.

For example, in the texture recognition device provided by at least one embodiment of the present disclosure, each of the image sensors comprises a photosensor and the plurality of signal switches electrically connected to the photosensor; and the plurality of signal switches are connected with a same texture collection line.

For example, in the texture recognition device provided by at least one embodiment of the present disclosure, each of the image sensors comprises a plurality of sub-image sensors, each of the sub-image sensors comprises a photosensor and a signal switch electrically connected to the photosensor; a plurality of sub-signals of the plurality of sub-image sensors comprised in each of the image sensors are respectively output to a data output circuit through the signal switches of the plurality of sub-image sensors, and then the data output circuit superimposes the plurality of sub-signals to obtain a signal of each of the image sensors for forming one image pixel of the texture image.

For example, in the texture recognition device provided by at least one embodiment of the present disclosure, each of the image sensors comprises a plurality of sub-image sensors, each of the sub-image sensors comprises a photosensor and at least two signal switches electrically connected to the photosensor, a plurality of sub-signals of the plurality of sub-image sensors comprised in each of the image sensors are respectively output through the signal switches of the plurality of sub-image sensors and then are superimposed to obtain a signal of each of the image sensors, and then the signal of each of the image sensors obtained by superposition is output to a data output circuit for forming one image pixel of the texture image.

For example, in the texture recognition device provided by at least one embodiment of the present disclosure, the plurality of sub-image sensors of each of the image sensors are arranged in an array of M×N, wherein M and N are positive integers and at least one selected from a group consisting of M and N is larger than 1.

For example, in the texture recognition device provided by at least one embodiment of the present disclosure, the light source is a point light source, a linear light source, a Z-shaped light source or a light source in a shape of Chinese character "回".

For example, the texture recognition device provided by at least one embodiment of the present disclosure further comprises a display panel, the display panel comprises a pixel unit array, the pixel unit array comprises a plurality of pixel units; the pixel unit array comprises the light source array, and each of the plurality of light sources comprises one or more pixel units of the plurality of pixel units.

For example, in the texture recognition device provided by at least one embodiment of the present disclosure, each of the light sources comprises at least two pixel units; where the at least two pixel units comprised in each of the light sources are arranged to form a point light source, the at least two pixel units comprised in each of the light sources are configured to be lit alternately.

For example, in the texture recognition device provided by at least one embodiment of the present disclosure, the display panel comprises an organic light-emitting diode display panel or a quantum dot light-emitting diode display panel.

For example, the texture recognition device provided by at least one embodiment of the present disclosure further comprises a controller; the plurality of light sources comprise at least one first light source and at least one second light source, and the second light source is offset from the first light source by a first distance along a first direction; the controller is configured to control the first light source to be lit at a first moment and control the second light source to be lit at a second moment different from the first moment during the texture collection performed by the image sensor array.

For example, in the texture recognition device provided by at least one embodiment of the present disclosure, the plurality of light sources further comprise at least one third light source, the third light source is offset from the first light source by a second distance along the first direction, and the second distance is smaller than the first distance; the controller is further configured to control the third light source to be lit at a third moment different from both the first moment and the second moment during the texture collection performed by the image sensor array.

For example, in the texture recognition device provided by at least one embodiment of the present disclosure, a time interval between the third moment and the first moment is larger than or equal to afterimage elimination time of the image sensors.

For example, in the texture recognition device provided by at least one embodiment of the present disclosure, the controller is further configured to control a plurality of first light sources arranged in a first pattern to be lit at the first moment, and control a plurality of second light sources arranged in a second pattern to be lit at the second moment during the texture collection performed by the image sensor array; the second patter is offset from the first pattern by the first distance along the first direction.

For example, in the texture recognition device provided by at least one embodiment of the present disclosure, the controller is further configured to control a plurality of third light sources in a third pattern to be lit at a third moment different from both the first moment and the second moment, and the third pattern is offset from the first pattern by a second distance along the first direction, and the second distance is less than the first distance.

For example, in the texture recognition device provided by at least one embodiment of the present disclosure, the first pattern, the second pattern and the third pattern are same.

For example, in the texture recognition device provided by at least one embodiment of the present disclosure, an imaging range of the first light source on the image sensor array is in a first annular shape, and an imaging range of the second light source on the image sensor array is in a second annular shape; the first annular shape does not overlap with the second annular shape or an area of an overlapping region of the first annular shape and the second annular shape is smaller than an interference threshold.

For example, in the texture recognition device provided by at least one embodiment of the present disclosure, an imaging range of the first light source on the image sensor array is in a first annular shape, an imaging range of the second light source on the image sensor array is in a second annular shape, and an imaging range of the third light source on the image sensor array is in a third annular shape; the third annular shape covers a ring center of the first annular shape, and the first annular shape does not overlap with the second annular shape or the area of the overlapping region of the first annular shape and the second annular shape is smaller than the interference threshold.

At least one embodiment of the present disclosure further provides an operation method of a texture recognition device, and the texture recognition device comprises a light source array and an image sensor array. The light source array comprises a plurality of light sources; the image sensor array is at a side of the light source array and comprises a plurality of image sensors; the plurality of image sensors are configured to receive light emitted from the plurality of light sources and reflected to the image sensors by a texture for a texture image collection, and each of the image sensors comprises a plurality of signal switches; the operation method comprises: reading a signal of each of the image sensors through the plurality of signal switches for forming one image pixel of the texture image.

For example, in the operation method of the texture recognition device provided by at least one embodiment of the present disclosure, each of the image sensors comprises a photosensor and the plurality of signal switches electrically connected to the photosensor; the operation method further comprises: providing a driving signal to the plurality signal switches of each of the image sensors by a same texture collection line.

For example, in the operation method of the texture recognition device provided by at least one embodiment of the present disclosure, ach of the image sensors comprises a plurality of sub-image sensors, each of the sub-image sensors comprises a photosensor and a signal switch electrically connected to the photosensor; the operation method further comprises: respectively outputting a plurality of sub-signals of the plurality of sub-image sensors comprised in each of the image sensors to a data output circuit, and then allowing the data output circuit to superimpose the plurality of sub-signals for forming one image pixel of the texture image.

For example, in the operation method of the texture recognition device provided by at least one embodiment of the present disclosure, each of the image sensors comprises a plurality of sub-image sensors, each of the sub-image sensors comprises a photosensor and a signal switch electrically connected to the photosensor, the operation method further comprises: allowing a plurality of sub-signals of the plurality of sub-image sensors comprised in each of the image sensors to be superimposed, and then to be output to a data output circuit for forming one image pixel of the texture image.

For example, in the operation method of the texture recognition device provided by at least one embodiment of the present disclosure, the texture recognition device comprises a display panel, the display panel comprises a pixel unit array, and the pixel unit array comprises a plurality of pixel units; the pixel unit array comprises the light source array, and each of the plurality of light sources comprises one or more pixel units of the plurality of pixel units; the operation method further comprises: lighting the one or more pixel units of the plurality of pixel units of each of the plurality of light sources to form a point light source, a linear light source, a Z-shaped light source or a light source in a shape of Chinese character "回".

For example, in the operation method of the texture recognition device provided by at least one embodiment of the present disclosure, each of the light sources comprises at least two pixel units for forming the point light source; the operation method further comprises: lighting the at least two pixel units for forming the point light source alternately.

For example, in the operation method of the texture recognition device provided by at least one embodiment of the present disclosure, the plurality of light sources comprise at least one first light source and at least one second light source, and the second light source is offset from the first light source by a first distance along a first direction; the operation method further comprises: lighting the first light source at a first moment and lighting the second light source at a second moment different from the first moment during the texture collection performed by the image sensor array.

For example, in the operation method of the texture recognition device provided by at least one embodiment of the present disclosure, the plurality of light sources further comprise at least one third light source, the third light source is offset from the first light source by a second distance along the first direction, and the second distance is smaller than the first distance; the operation method further comprises: lighting the third light source at a third moment different from both the first moment and the second moment during the texture collection performed by the image sensor array.

For example, in the operation method of the texture recognition device provided by at least one embodiment of the present disclosure, an imaging range of the first light source on the image sensor array is in a first annular shape, and an imaging range of the second light source on the image sensor array is in a second annular shape; the first annular shape does not overlap with the second annular shape or an area of an overlapping region of the first annular shape and the second annular shape is smaller than an interference threshold.

For example, in the operation method of the texture recognition device provided by at least one embodiment of the present disclosure, an imaging range of the first light source on the image sensor array is in a first annular shape, an imaging range of the second light source on the image sensor array is in a second annular shape, and an imaging range of the third light source on the image sensor array is in a third annular shape; the third annular shape covers a ring center of the first annular shape, and the first annular shape does not overlap with the second annular shape or the area of the overlapping region of the first annular shape and the second annular shape is smaller than an interference threshold.

For example, in the operation method of the texture recognition device provided by at least one embodiment of the present disclosure, a time interval between the third moment and the first moment is larger than or equal to afterimage elimination time of the image sensors.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
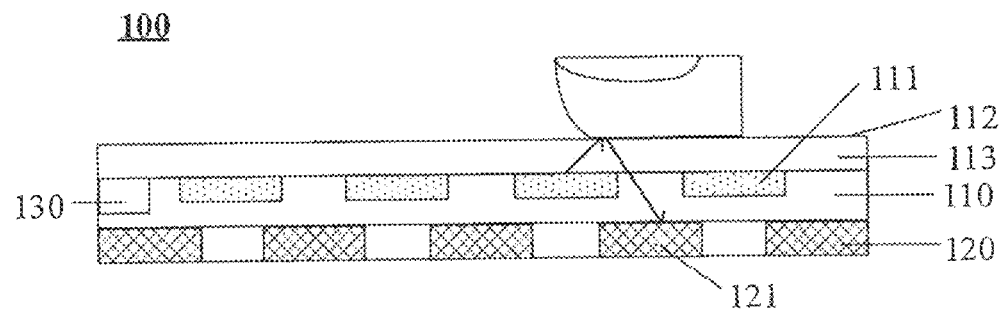
FIG. 1A is a cross-sectional schematic diagram of a texture recognition device provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various under-screen texture recognition function components. Also, the terms "a," "one," or "the" and the like are not intended to indicate any limitation to amounts, but represent at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect" or "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

At present, a technology of narrow border display screen is gradually becoming a mainstream. One means to realize this technology is to integrate image sensors with a fingerprint recognition function into a display device, which realizes a fingerprint recognition mode under the screen and increases an area of a display region of the display device.

An image sensor of a texture recognition device generally comprises a photosensor and a switch transistor electrically connected with the photosensor. A gate electrode of the switch transistor is electrically connected with a texture collection line, a source electrode of the switch transistor is electrically connected with the photosensor, and a drain electrode of the switch transistor is electrically connected with a detection output line. In this way, when the texture collection line transmits a gate on signal, the switch transistor is turned on to electrically connect the photosensor to a driving circuit through the detection output line, so that the driving circuit obtains an electrical signal generated by the photosensor. When the texture collection line transmits a gate off signal, the switch transistor is turned off. In this way, the driving circuit determines a texture image according to the electrical signal obtained.

Figure 8:
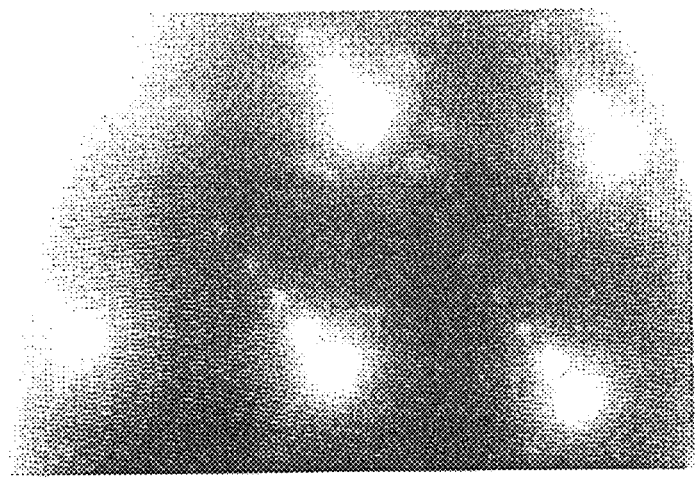
FIG. 8 is an image of an afterimage in a texture image.

However, when the texture collection line transmits the gate off signal, electrical signals inside the image sensor need certain time to be released. If a next frame of image is collected before the release of the electrical signals inside the image sensor is completed, residual signals and signals for forming the next frame of image are superimposed, which results in that the next frame of image has an afterimage. FIG. 8 illustrates a frame of a texture image with an afterimage. As shown in FIG. 8, the point in the image that gradually weakens on a side of the large circle spot is the afterimage that appears in the current frame of the texture image because the image sensor does not completely release photo-generated charges after a previous frame of texture image is collected, and the afterimage seriously affects the definition and accuracy of the texture image. Therefore, the texture image may be collected in a time-sharing manner, and in the time-sharing manner, after one frame of texture image is collected, another frame of clear and accurate texture image can be obtained only after a certain period of time, otherwise the afterimage of the previous frame of texture image which does not disappear is superimposed with the next frame of texture image, so that the image texture obtained finally is unclear and inaccurate. However, waiting for the certain period of time increases the acquisition time of the texture image, which affects user experience.

At least one embodiment of the present disclosure provides a texture recognition device, and the texture recognition device comprises a light source array and an image sensor array. The light source array comprises a plurality of light sources; the image sensor array is at a side of the light source array and comprises a plurality of image sensors, and the plurality of image sensors are configured to receive light emitted from the plurality of light sources and reflected to the image sensors by a texture for a texture image collection; each of the image sensors comprises a plurality of signal switches, and a signal of each of the image sensors is used to form one image pixel of the texture image.

At least one embodiment of the present disclosure provides an operation method of a texture recognition device, and the texture recognition device comprises a light source array and an image sensor array. The light source array comprises a plurality of light sources; the image sensor array is at a side of the light source array and comprises a plurality of image sensors, the plurality of image sensors are configured to receive light emitted from the plurality of light sources and reflected to the image sensors by a texture for a texture image collection, and each of the image sensors comprises a plurality of signal switches; the operation method comprises: reading a signal of each of the image sensors through the plurality of signal switches for forming one image pixel of the texture image.

In the following, the texture recognition device and the operation method of the texture recognition device provided by embodiments of the present disclosure are described in detail with reference to the drawings.

Figure 1B:
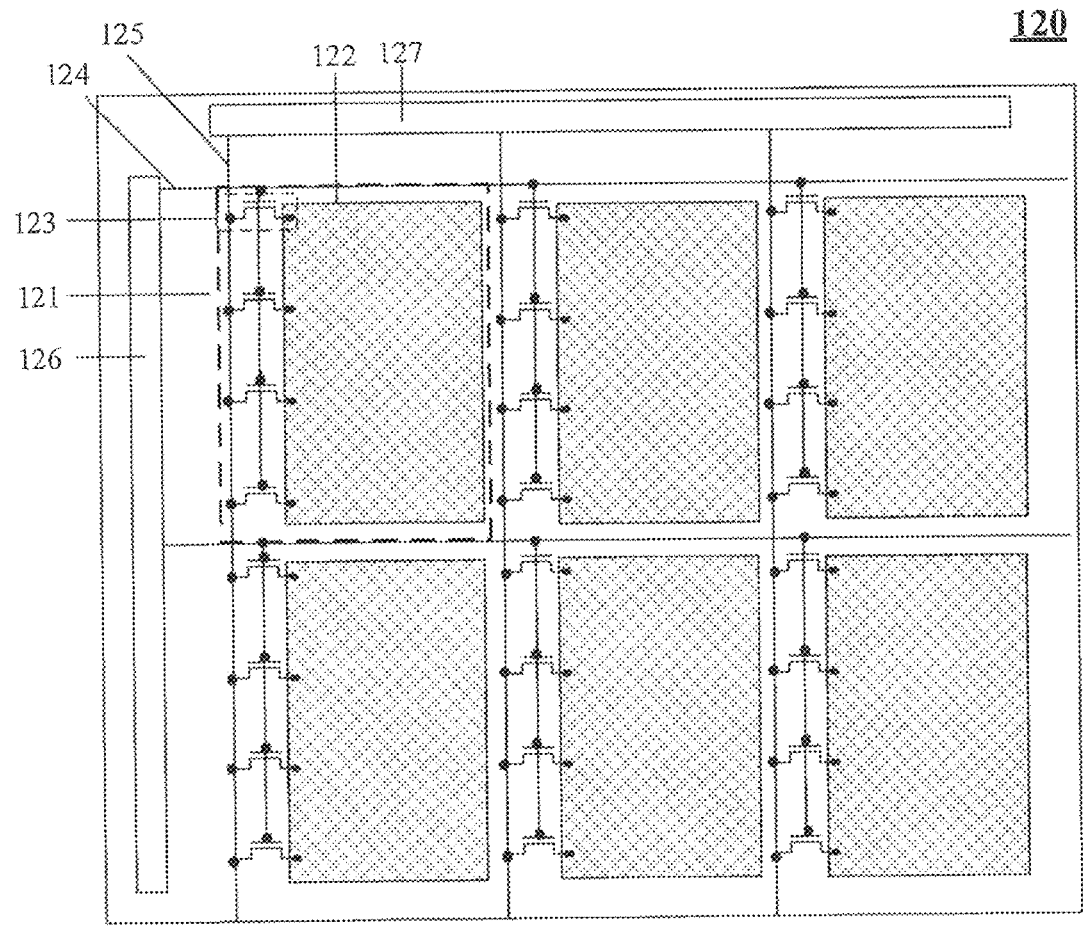
FIG. 1B is a planar schematic diagram of an image sensor array in a texture recognition device provided by at least one embodiment of the present disclosure.
Figure 1C:
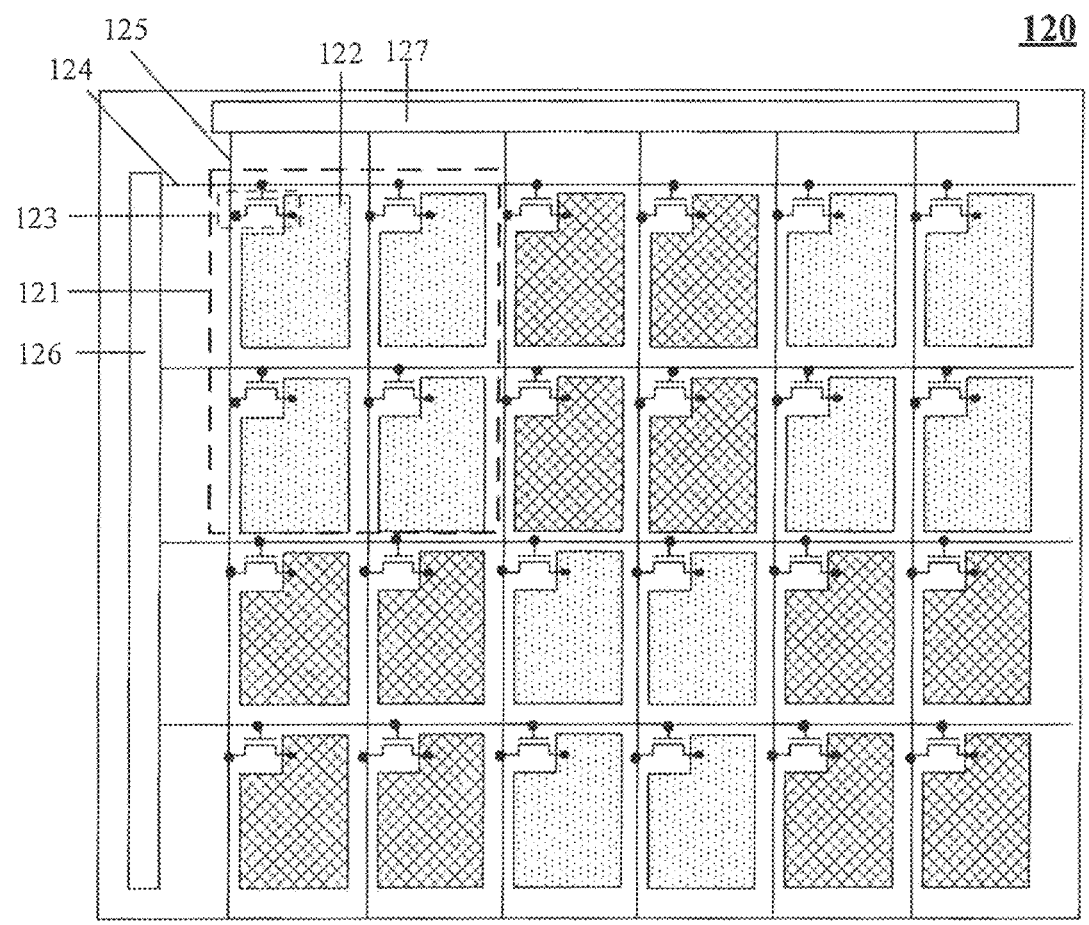
FIG. 1C is a planar schematic diagram of another image sensor array in a texture recognition device provided by at least one embodiment of the present disclosure.
Figure 1D:
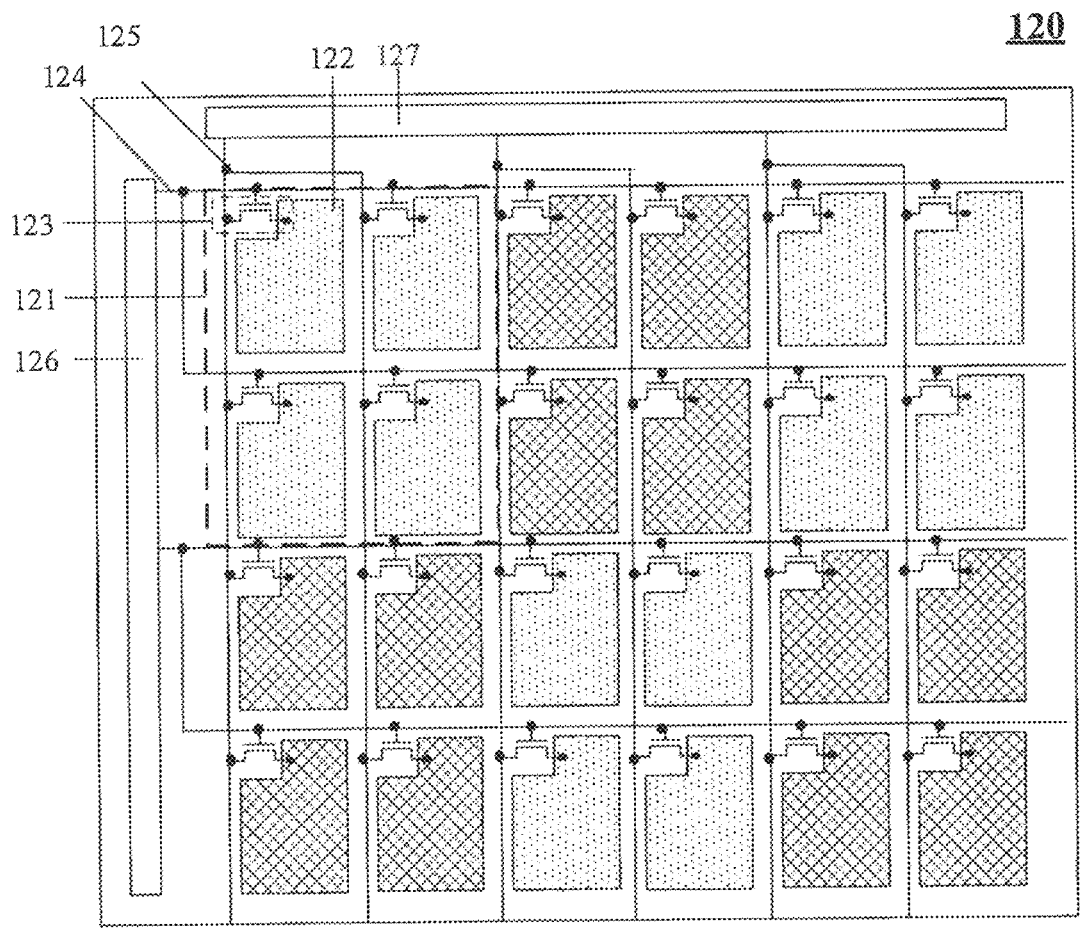
FIG. 1D is a planar schematic diagram of further another image sensor array in a texture recognition device provided by at least one embodiment of the present disclosure.

FIG. 1A is a cross-sectional schematic diagram of a texture recognition device 100 provided by some embodiments of the present disclosure; FIG. 1B is a planar schematic diagram of an image sensor array 120 in the texture recognition device 100 provided by the embodiments; FIG. 1C is a planar schematic diagram of another image sensor array 120 in the texture recognition device 100 provided by the embodiments; FIG. 1D is a planar schematic diagram of further another image sensor array 120 in the texture recognition device 100 provided the embodiments.

As shown in FIG. 1A and FIG. 1B, the texture recognition device 100 has a touch side 112 (shown as an upper side of the texture recognition device 100 in FIG. 1A), and includes a light source array and the image sensor array 120, and for example, the texture recognition device 100 can be used for collection of texture (e.g., fingerprint or palm print), so as to be used for fingerprint recognition or palmprint recognition.

The light source array includes a plurality of light sources 111, these light sources 111 are arranged in an array in a predetermined region; the image sensor array 120 is disposed on a side of the light source array, for example, on a side of the light source array away from the touch side. The image sensor array 120 includes a plurality of image sensors 121, and the plurality of image sensors 121 are configured to receive light emitted from the plurality of light sources 111 and reflected to the image sensors 121 by a texture for a texture image collection. For example, the light reflected to the image sensors 121 is light reflected into the texture recognition device 100 by an operation body having the texture (e.g., an operator's finger or palm).

For example, as shown in FIG. 1B, each of the image sensors 121 includes a photosensor 122 and a plurality of signal switches electrically connected to the photosensor 122, for example, the signal switches are switch transistors 123, and the plurality of signal switches of each image sensor 121 are connected to a same texture collection line 124, so that on-off states of the plurality of signal switches are the same. A signal of each of the image sensors 121 is read through the plurality of signal switches for forming one image pixel of the texture image. In some embodiments, as shown in FIG. 1C and FIG. 1D, each of the image sensors 121 includes a plurality of sub-image sensors (the number of the sub-image sensors is four as shown in FIG. 1C and FIG. 1D), and the plurality of sub-image sensors included in each of the image sensors 121 are separately driven, for example, as shown in FIG. 1C and FIG. 1D, each of the sub-image sensors includes one photosensor 122 and one switch transistor 123, and a plurality of sub-signals of the plurality of sub-image sensors of each of the image sensors 121 are superimposed to form one image pixel of the texture image.

For example, the plurality of sub-image sensors of each of the image sensors are arranged in an array of M×N, in which M and N are positive integers and at least one selected from a group consisting of M and N is larger than 1. For example, in some embodiments, the plurality of sub-image sensors of each of the image sensors are arranged in an array of 2×2, an array of 2×3 or an array of 3×3, etc., and no limitation is imposed to this in the embodiments of the present disclosure.

As shown in FIG. 1C and FIG. 1D, each of the plurality of sub-image sensors of each of the image sensors 121 includes the photosensor 122 and the switch transistor 123 electrically connected to the photosensor 122. Therefore, overall, each of the image sensors 121 includes a plurality of signal switches, and the plurality of signal switches are used for reading out electrical signals generated by photoelectric actions from the image sensor for forming one image pixel of the texture image.

For example, the photosensor 122 may adopt a photodiode, for example, the photodiode is a PN-type photodiode or a PIN-type photodiode, and for example, a semiconductor material adopted by the photodiode comprises at least one selected from a group consisting of silicon, germanium, selenium, gallium arsenide, and so on. The switch transistor 123 includes functional portions such as a gate electrode, a source electrode, a drain electrode, and a channel. The gate electrode of the switch transistor 123 is electrically connected to the texture collection line 124, the texture collection line 124 is electrically connected to a scan driving circuit 126; the source electrode of the switch transistor 123 is electrically connected to the photosensor 122; the drain electrode of the switch transistor is electrically connected to a detection output line 125, and the detection output line 125 is connected to a data output circuit 127. In this way, when the texture collection line 124 transmits a gate on signal provided by the scan driving circuit 126, the switch transistor 123 is turned on to couple the photosensor 122 with the data output circuit 127 through the detection output line 125, so that the data output circuit 127 acquires electrical signals generated by the photosensor 122, for example, signals of the plurality of sub-image sensors of each of the image sensors 121 are superimposed to form one image pixel of the texture image. When the texture collection line 124 transmits a gate off signal provided by the scan driving circuit 126, the switch transistor 123 is turned off. Thus, the data output circuit 127 determines the texture image based on the plurality of electrical signals acquired by the data output circuit 127.

For example, in some embodiments, each of the image sensors 121 comprises a plurality of sub-image sensors, and is configured that a plurality of sub-signals of the plurality of sub-image sensors comprised in each of the image sensors 121 are respectively output to the data output circuit 127 through the switch transistors 123, and then the data output circuit 127 superimposes these sub-signals to obtain a signal of each of the image sensors for forming one image pixel of the texture image. For example, in the example as illustrated in FIG. 1C, the four sub-image sensors are arranged in an array of 2×2, a gate line 124 corresponding to each row of the array is separately connected to the scan driving circuit 126, and a data line 125 corresponding to each column of the array is separately connected to the data output circuit 127, so that the electrical signals of the four sub-image sensors can be read out separately, and then the four electrical signals are superimposed to form one image pixel of the texture image.

For example, in some embodiments, each of the image sensors 121 comprises a plurality of sub-image sensors, and is configured that a plurality of sub-signals of the plurality of sub-image sensors comprised in each of the image sensors 121 are respectively output through the switch transistors 123 and then are superimposed to obtain a signal of each of the image sensors, and then the signal of each of the image sensors obtained by the superposition is output to the data output circuit 127 for forming one image pixel of the texture image. For example, in the example as illustrated in FIG. 1D, the four sub-image sensors are also arranged in the array of 2×2, the gate lines 124 corresponding to two rows of the array are connected to each other and are connected to the scan driving circuit 126, and the data lines 125 corresponding to two columns of the array are connected to each other and are connected to the data output circuit 127, and therefore, for the four sub-image sensors, a sum of four electrical signals respectively of the four sub-image sensors is read out in unify for forming one image pixel of the texture image.

For example, for the embodiment shown in FIG. 1B and the embodiment shown in FIG. 1C (or FIG. 1D), an area of a projection of each image sensor on a substrate is equal to each other, for example, a photosensitive area of a single photosensor in FIG. 1B is larger than a sum of photosensitive areas of the four photosensors in FIG. 1C, or substantially equal to the sum of the photosensitive areas of the four photosensors in FIG. 1C.

For example, in some embodiments, the signal transmission and release performance of the switch transistor 123 can be adjusted by adjusting a length-width ratio of the channel of the switch transistor 123. For example, in some embodiments of the present disclosure, the length-width ratio of the channel of the switch transistor 123 is further increased, thereby further increasing the signal release speed of the switch transistor 123.

In the texture recognition device 100, each of the image sensors 121 includes a plurality of switch transistors 123, so that the release speed of the electrical signals is increased, and the time of eliminating the afterimage is shortened. In some embodiments, each of the image sensors 121 includes the plurality of sub-image sensors, the plurality of sub-image sensors are separately driven and each of the sub-image sensors includes the switch transistor 123, and therefore the image sensor 121 can separately release (e.g., release simultaneously) the electrical signals in each of the sub-image sensors while ensuring that the signal amount obtained (a sum of the signal amounts of the four sub-image sensors) is large enough, thereby improving the release speed of the electrical signals and reducing the time of eliminating the afterimage. For example, in the above embodiments, the signal amount in one image sensor 121 is released through four switch transistors 123. Compared with the case that the signal amount in one image sensor 121 is released through one switch transistor 123, this solution can greatly improve the release speed of the electrical signals and reduce the time of eliminating the afterimage. Therefore, in the case that the image collection is performed in a time-sharing manner, the speed of the image collection is increased while ensuring the clarity and accuracy of the image collected.

Referring to FIG. 1A, when an operation body with a texture, such as a finger, touches a surface of the touch side 112 of the texture recognition device 100, the light emitted by the light sources 111 can be reflected by the operation body, for example, the light reaches the image sensors 121 through gaps between the light sources 111 in the light source array, thus the image sensors 121 can collect the texture image of the operation body.

As mentioned above, the operation body with the texture may be a hand, and in this case, the texture recognized by the image sensors 121 is a skin texture, such as a fingerprint, a palm print, etc.; in addition, the operator with the texture may also be non-living bodies with a certain texture, such as objects with a certain texture made of materials such as resin, etc., and no limitation is imposed to this in the embodiments of the present disclosure.

In the above embodiment, the image sensor array 120 is disposed on the side of the light source array away from the touch side 112. For example, in other embodiments, the image sensor array 120 is arranged in a same layer as the light source array, for example, the plurality of image sensors 121 included in the image sensor array 120 and the light sources 111 are arranged alternately in the same layer. For example, the plurality of image sensors 121 and the light sources 111 are formed on a same array substrate together by a semiconductor process. For example, in the case that a pixel unit army or a part of the pixel unit array is multiplexed as the light source array, for example, the signal switches of the image sensors are formed together with switch elements (e.g., thin film transistors) in the pixel units in a same process, thereby simplifying the manufacturing process of the texture recognition device, reducing the cost, and making the thickness of the texture recognition device smaller.

For another example, the light source array is formed on a side of the image sensor array 120 away from the touch side. In this case, the light emitted from the light sources 111 may be emitted from a gap between adjacent image sensors 121 and reflected to the image sensor 121 by the texture. For further another example, the image sensor array 120 is separately prepared as a detection chip and then is mounted on a side of the texture recognition device 100.

The embodiments of the present disclosure do not specifically limit the arrangement manner of the image sensor array 120 and the light source array, as long as the plurality of image sensors 121 can receive the light emitted from the light sources 111 and reflected to the image sensors 121 by the texture for the texture collection.

Figure 2:
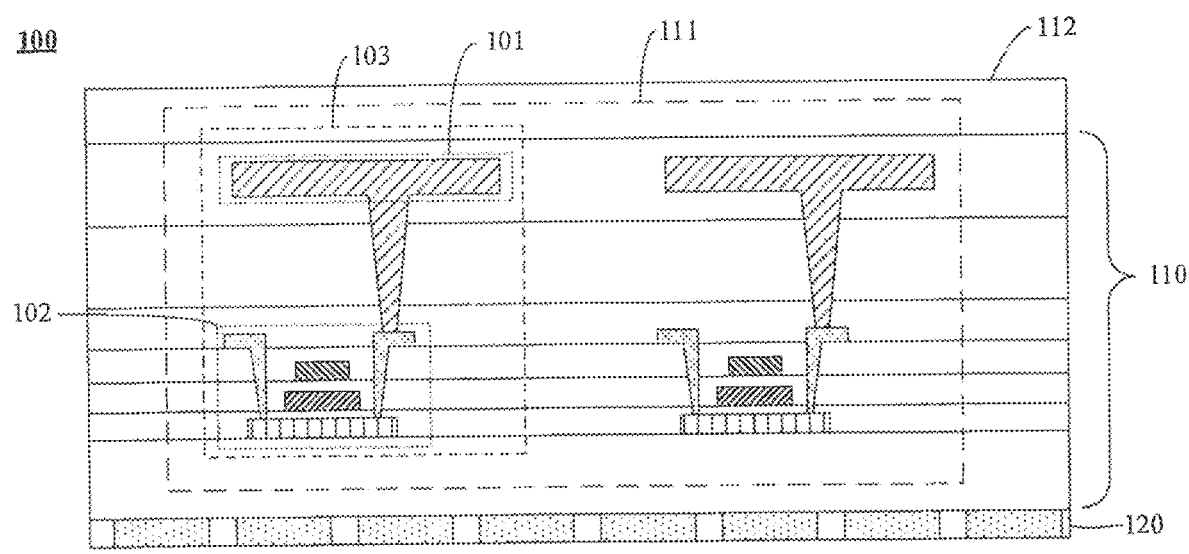
FIG. 2 is a cross-sectional schematic diagram of another texture recognition device provided by at least one embodiment of the present disclosure.

For example, in some embodiments, as shown in FIG. 2, the texture recognition device 100 is, for example, a display device having an under-screen texture recognition function, and correspondingly includes a display panel 110 including a pixel unit array; the pixel unit array includes a plurality of pixel units 103. For example, each of the pixel units includes a thin film transistor 102 and a light-emitting component 101, and the light-emitting component 101 includes, for example, an anode, a cathode, and a light emitting layer (not shown) between the anode and the cathode. For example, each of the pixel units 103 includes a plurality of sub-pixel units that emit light of different colors (e.g., red light, blue light, and green light), or each of the pixel units 103 may also emit monochromatic light (e.g., red light, blue light, and green light), and no limitation is imposed to this in the embodiments of the present disclosure.

For example, the pixel unit array of the display panel 110 is implemented as the light source array, and the plurality of pixel units 103 are implemented to form the plurality of light sources 111. That is, the pixel units 103 of the display panel 110 are multiplexed as photosensitive light sources, so that the compactness of the device is improved and the arrangement difficulty of each functional structure is reduced. For example, each of the light sources 111 includes one or more pixel units of the plurality of pixel units 103, so that each of the light sources 111 can be formed into a light source having a certain shape such as a point light source, a line light source, a Z-shaped light source, a light source in a shape of Chinese character "回", or the like by different arrangements of the one or more pixel units 103.

Figure 6A:
FIG. 6A and FIG. 6B are schematic diagrams of shapes of light sources in a texture recognition device provided by at least one embodiment of the present disclosure.
Figure 6B:
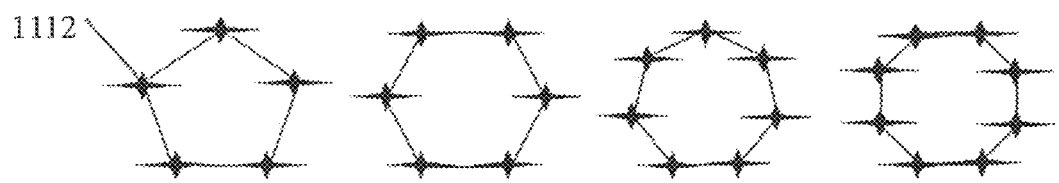
Figure 6C:
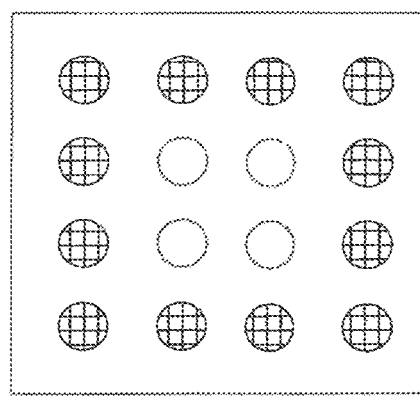
FIG. 6C-FIG. 6E are schematic diagrams of the cases that a plurality of pixel units are lighted to form light sources in different shapes in a texture recognition device provided by at least one embodiment of the present disclosure.
Figure 6D:
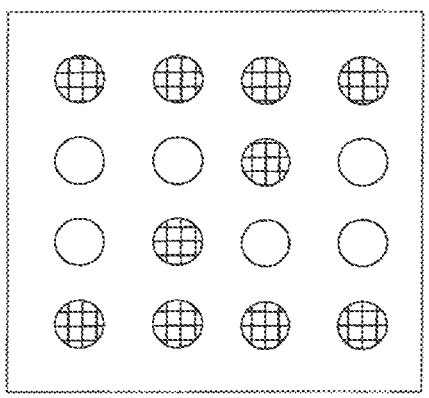
Figure 6E:
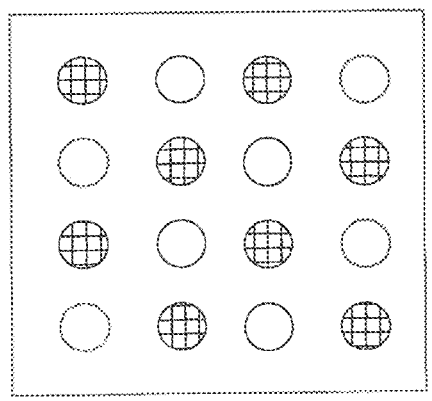

The light source in a shape of Chinese character "回" refers to a light source that does not emit light at a center of the light source, for example, as shown in FIG. 6C, a shape of Chinese character "回" as shown in FIG. 6C is formed by selectively lighting the outermost light sources among the pixel units arranged in an array of 4×4 but not lighting the pixel units arranged in an array of 2×2 in a central region. As shown in FIG. 6D, a Z-shaped light source is formed by selectively lighting light sources at some specific positions in the pixel units arranged in the array of 4×4. For another example, in some embodiments, the point light source includes pixel units continuously arranged in the array of 4×4, and all of these pixel units in the array of 4×4 are lit, or, as shown in FIG. 6E, light sources in the 4×4 pixel units are lit alternately, so that the lit pixel units are discontinuous, but overall, this lighting manner also forms a point light source. The above-mentioned lighting manners of the light sources prevent the formation of the texture image from being influenced by excessive energy of the light sources. For example, the light source may be formed in other shapes, and no specific limitation is imposed to this in the embodiments of the present disclosure.

For example, the pixel units 103 in an entirety of a display region of the display panel 110 are controlled to be multiplexed as the photosensitive light sources, and for example, the image sensor array 120 may be correspondingly arranged under the entire display region, thereby realizing full screen texture recognition.

For example, the display panel 110 is an organic light-emitting diode (OLED) display panel or a quantum dot light emitting diodes (QLED) display panel, etc. No specific limitation is imposed to this in the embodiments of the present disclosure. The OLED display panel is, for example, a flexible OLED display panel. The OLED display panel has a self-luminous characteristic, and light emission of display pixel units of the OLED display panel can be controlled or modulated according to needs, thus providing convenience for the texture collection and helping to improve the integration level of the device.

For example, the display panel 110 further includes signal lines (including gate lines, data lines, detection lines, etc.) for providing electrical signals (including scanning signals, data signals, detection signals, etc.) in addition to the pixel unit array. For example, the light emitting state of the light-emitting component is controlled by a driving circuit to realize the lighting of the pixel units. For example, a protection cover plate 113 is provided on the display panel 110, and a surface of the protection cover plate 113 forms the surface of the touch side 112. The protection cover plate 113 is made of a transparent material such as glass or polyimide, for example. For example, in some embodiments, the display panel 110 further includes functional layers such as a touch layer, a polarizer layer and so on, which can be bonded to the display panel 110 by an optically clear adhesive (OCA adhesive). The embodiments of the present disclosure do not specifically limit other structures of the display panel 110.

For example, in other embodiments, the display device with the under-screen texture recognition function includes a display panel 110 and light emitting components separately provided as the photosensitive light sources for realizing the texture recognition, and these light emitting components, for example, are disposed between adjacent pixel units in the pixel unit array or overlap with the pixel units, and no limitation is imposed to this in the embodiments of the present disclosure.

For example, in the texture recognition device 100, when a point light source or a line light source emits light and the light emitted toward the touch side 112 is irradiated onto the touch side surface, because of total reflection on the touch side surface, a total reflection effect occurs on a part of the light whose incident angle is larger than or equal to a critical angle θ of the total reflection, resulting in that the part of the light cannot be emitted out through the touch side surface, thereby generating an annular total reflection region. Accordingly, a part of the light whose incident angle is smaller than the critical angle θ of the total reflection is emitted out through the touch side surface. The texture image collection can be performed by the light reflected from the total reflection region. For example, when a ridge of the fingerprint touches the total reflection region, the total reflection condition of the corresponding position is destroyed, while when a valley of the fingerprint touches the total reflection region, the total reflection condition of the corresponding position is not destroyed. In this way, because of the different influences of the valley and the ridge, the light incident on the image sensor array 120 is different at different positions to form the texture image with alternate light and shade.

In addition, a ring center of the annular total reflection region becomes an invalid detection region because of interference caused by light emitted out through the touch side surface and light reflected by structures inside the texture recognition device. In order to obtain a complete texture image, an additional detection is required for the invalid detection region of the ring center.

Figure 3:
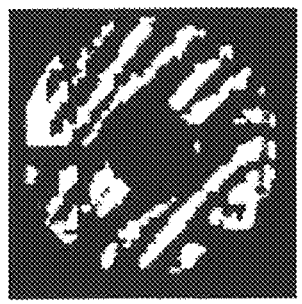
FIG. 3 is a texture image formed by a light source of a texture recognition device provided by at least one embodiment of the present disclosure.

For example, in some embodiments, when the operation body having the texture, such as a finger, touches the surface of the touch side 112 of the texture recognition device 100, because of the annular total reflection region described above, as shown in FIG. 3, an imaging range of one light source 111 is formed in an annular shape, and the imaging range of the one light source 111 is limited, so that a sufficient texture image may not be obtained. In this case, a plurality of light sources II may be lit simultaneously or in a time-sharing manner to enable the image sensor array 120 to obtain a texture image with a larger area (e.g., a complete texture image) of the fingerprint.

Figure 4A:
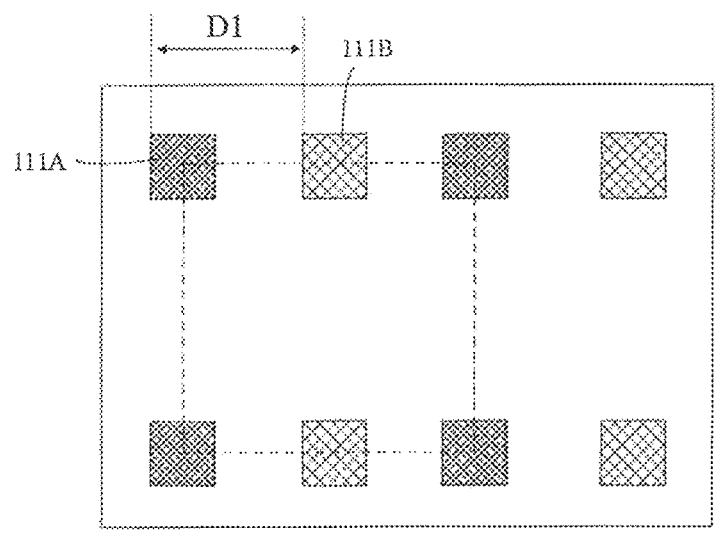
FIG. 4A is a schematic diagram of a part of a light source array in a texture recognition device provided by at least one embodiment of the present disclosure.

For example, in some embodiments, the texture recognition device further includes a controller 130, the controller 130 is coupled to the light source array and is thus connected in signal with the light source array to control the operation of the light source array. For example, as shown in FIG. 4A, the plurality of light sources 111 include at least one first light source 111A and at least one second light source 111B. The second light source 111B is offset from the first light source 111A by a first distance D1 along a first direction (shown as a horizontal direction in FIG. 4A, or the first direction may be a vertical direction or a certain inclined direction in other embodiments). The first distance D1, for example, enables an imaging range of the first light source 111A on the image sensor array 120 to not overlap with an imaging range of the second light source 111B on the image sensor array 120, or an area of an overlapping region of the imaging range of the first light source 111A and the imaging range of the second light source 111B to be smaller than an interference threshold (i.e., the interference is within an acceptable range). In this case, the controller 130 is configured to control the first light source 111A to be lit at a first moment and control the second light source 111B to be lit at a second moment different from the first moment during the texture collection performed by the image sensor array 120. Because the first distance D1 enables that the imaging range of the first light source 111A on the image sensor array 120 does not overlap with the imaging range of the second light source 111B on the image sensor array 120, or the area of the overlapping region of the imaging range of the first light source 111A and the imaging range of the second light source 111B is smaller than the interference threshold, for example, a time interval between the first moment and the second moment may be very short to improve the speed of the image collection. Therefore, as shown in FIG. 4B, the image sensor array 120 can obtain a plurality of portions of the texture image in short time, and the plurality of portions of the texture image are spliced together to obtain the texture image in the whole range for the texture image recognition.

Figure 4B:
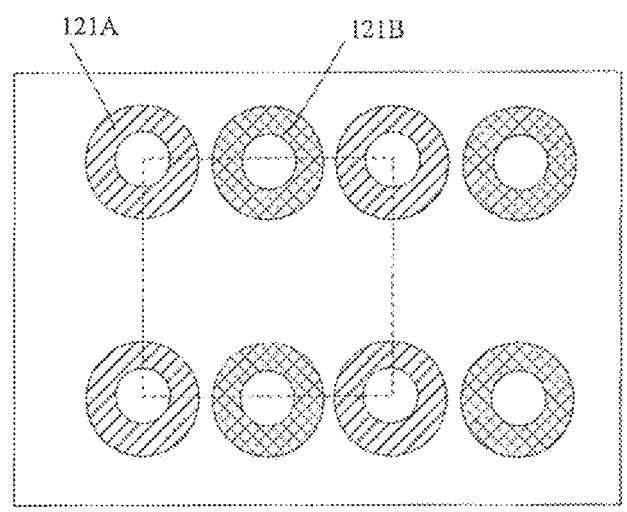
FIG. 4B is a schematic diagram of an imaging range of the light source array as illustrated in FIG. 4A.

For example, as shown in FIG. 4B, the imaging range of the first light source 111A on the image sensor array 120 is in a first annular shape 121A, and the imaging range of the second light source 11B on the image sensor array 120 is in a second annular shape 121B; the first annular shape 121A does not overlap with the second annular shape 121B or an area of an overlapping region of the first annular shape 121A and the second annular shape 121B is smaller than the interference threshold. For example, in the case that the second annular shape 121B has no overlapping portion with the ring center of the first annular shape 121A, the area of the overlapping region is considered to be smaller than the interference threshold. The ring center mentioned in the embodiments of the present disclosure refers to a portion of the annular shape in an inner ring of the annular shape, such as an unshaded portion inside the annular shape in the figure. A fingerprint image in the first annular shape 121A and a fingerprint image in the second annular shape 121B can be used together for the image recognition.

Figure 5A:
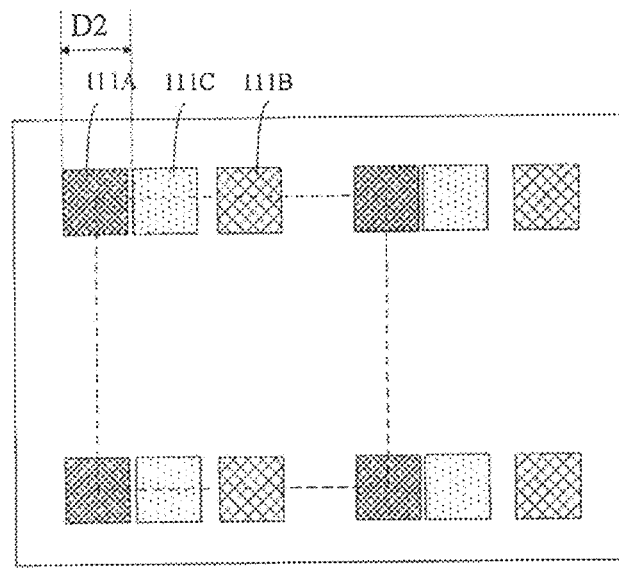
FIG. 5A is another schematic diagram of a part of a light source array in a texture recognition device provided by at least one embodiment of the present disclosure.

For example, in some embodiments, as shown in FIG. 5A, the plurality of light sources 111 further include at least one third light source 111C, and the third light source 111C is offset from the first light source 111A by a second distance D2 in the first direction, and the second distance D2 is smaller than the first distance D. For example, the second distance D2 is less than half of the first distance D1, so that the third light source 111C is between the first light source 111A and the second light source 111B and is closer to the first light source 111A. In this case, the controller 130 is further configured to control the third light source 111C to be lit at a third moment different from both the first moment and the second moment during the texture collection performed by the image sensor array 120, so that an imaging range of the third light source 111C can supplement the imaging range of the first light source 111A. For example, as shown in FIG. 5B, the plurality of portions of the texture images obtained by the image sensor array 120 can complement each other to form a more complete texture image.

Figure 5B:
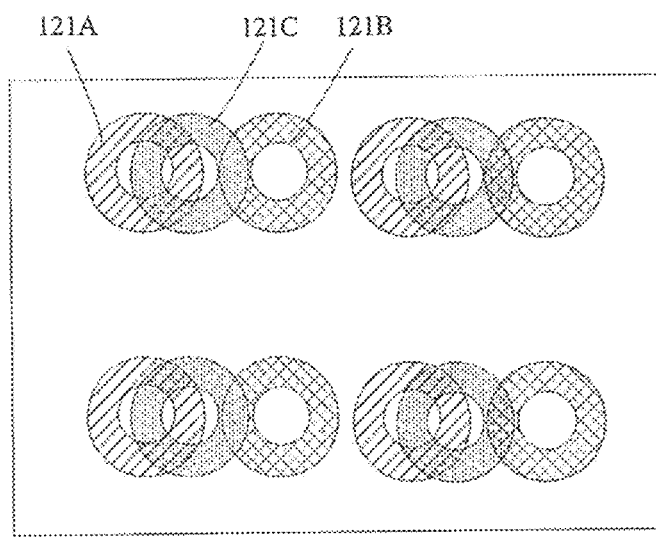
FIG. 5B is a schematic diagram of an imaging range of the light source array as illustrated in FIG. 5A.

For example, as shown in FIG. 5B, the imaging range of the first light source 111A on the image sensor array 120 is in the first annular shape 121A, and the imaging range of the second light source 121B on the image sensor array 120 is in the second annular shape 121B, and the imaging range of the third light source 111C on the image sensor array 120 is in a third annular shape 121C; the third annular shape 121C covers the ring center of the first annular shape 121A, and the first annular shape 121A does not overlap with the second annular shape 121B, or the area of the overlapping region of the first annular shape 121A and the second annular shape 121B is smaller than the interference threshold.

For example, the imaging range of the second light source 111B does not overlap with the imaging range of the third light source 111C, or an area of an overlapping region of the imaging range of the second light source 111B and the imaging range of the third light source 111C is smaller than the interference threshold. For example, in FIG. 5B, the imaging range of the second light source 111B has the overlapping portion which overlaps with the imaging range of the third light source 111C, but the area of this overlapping portion is smaller than the interference threshold. In this case, for example, a time interval between the third moment and the second moment may be very short to improve the speed of the image collection.

For example, a time interval between the third moment and the first moment is larger than or equal to afterimage elimination time of the image sensors 121, thus the influence caused by the imaging afterimage of the first light source 111A on the image sensors 121 on the imaging of the third light source 111C is eliminated. For example, the afterimage elimination time is determined by experiments or calculations in advance, so that the adverse effect caused by the afterimage is avoided by selecting an appropriate time interval between the third moment and the first moment. Thus, the image sensor array 120 can obtain a texture image that is not affected by the afterimage and has sufficient definition and integrity.

For another example, a time interval between the second moment and the third moment may be larger than or equal to the afterimage elimination time of the image sensors 121, thus the influence caused by the imaging afterimage of the second light source 111B on the image sensors 121 on the imaging of the third light source 111C is eliminated.

For example, in some embodiments, the afterimage elimination time is determined by the following method. The light source is controlled to emit light of a predetermined light intensity, and an electrical signal Lt1 generated by the photosensor 122 of the respective sub-image sensor is detected within a time period T1. After that, the light source is turned off, and an electrical signal $Lt2\_b$ generated by the photosensor 122 of the respective sub-image sensor is detected within B different time periods $T2\_b$ ($1 \leq b \leq B$; b is a positive integer, and B is a positive integer). For the electrical signal $Lt2\_b$ detected at each time period $T2\_b$, according to the electrical signal Lt1 and the electrical signal Lt2_b generated by the photosensor 122 of the respective sub-image sensor, an afterimage ratio Lag_b corresponding to the photosensor 122 of each sub-image sensor within the time period T2_b is determined, in which, $$\text{Lag\_b} = \frac{Lt1 - Lt2\_b}{Lt1}.$$

Then, according to the afterimage ratios Lag_b corresponding to the photosensor 122 of the respective sub-image sensor, an average value of the afterimage ratios corresponding to the time period T2_b is determined. In the case that the average value of the afterimage ratios corresponding to the time period T2_b meets an afterimage elimination proportion, the time period T2_b can be taken as the preset afterimage elimination time, in which, for example, the afterimage elimination proportion is a value in a range of 20% to 100%. For example, the afterimage elimination proportion is 20%, 50%, 70%, 80% or 100%. Of course, performances of the photosensors 122 of the sub-image sensors are different, and the preset afterimage elimination time of the photosensors 122 are also different, thus the specific value of the afterimage elimination ratio can be designed and determined according to actual application environments, and no limitation is imposed to this in the embodiment of the present disclosure.

For example, in some embodiments, in order to obtain a larger texture image, as shown in FIG. 4A, the controller 130 is further configured to control a plurality of first light sources 11A arranged in a first pattern (shown as a square in the figure) to be lit at a first moment, and control a plurality of second light sources 112B arranged in a second pattern (shown as a square in the figure) to be lit at a second moment, and the second pattern is offset from the first pattern by the first distance D1 in the first direction during the texture collection performed by the image sensor array 120. Thus, as shown in FIG. 4B, the image sensor array 120 can obtain a plurality of portions of the texture image, and the plurality of portions of the texture image can be used together for the image recognition.

Similarly, in some embodiments, as shown in FIG. 5A, the controller 130 is further configured to control a plurality of third light sources 111C in a third pattern (shown as a square in the figure) to be lit at a third moment different from both the first moment and the second moment, and the third pattern is offset from the first pattern by the second distance D2 along the first direction, and the second distance D2 is smaller than the first distance D1, for example, the second distance D2 is smaller than half of the first distance D1. Thus, as shown in FIG. 5B, the plurality of portions of the texture image obtained by the image sensor array 120 can complement each other to form a more complete texture image.

For example, in some embodiments, the first pattern, the second pattern, and the third pattern are the same as each other, thereby forming the plurality of portions of the texture image that are substantially in a same shape, which facilitates splicing the plurality of portions of the texture image respectively formed at different times.

Figure 7:
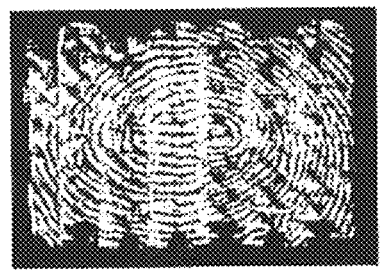
FIG. 7 is a texture image obtained by a texture recognition device provided by at least one embodiment of the present disclosure.

In some embodiments of the present disclosure, the shapes respectively formed by the plurality of first light sources 111A, the plurality of second light sources 112B, and the plurality of third light sources 11C are not limited to the square mentioned above, and may also be pentagonal, hexagonal, heptagonal, octagonal, circular, and the like as shown in FIG. 6A and FIG. 6B, for example. For example, the first light source 111A, the second light source 112B or the third light source 111C are point light sources 1111 as shown in FIG. 6A or line light sources 1112 as shown in FIG. 6B. In the case that the light source 11 includes one or more pixel units, the point light source 111 or the line light source 1112 can be obtained by lighting one or more pixel units. For example, in some embodiments, the plurality of light sources in a plurality of first patterns, a plurality of second patterns, and a plurality of third patterns may also be controlled to be lit, for example, the plurality of light sources in the plurality of first patterns, the plurality of second patterns, and the plurality of third patterns that are arranged in an array are controlled to be lit, thereby realizing recognition of a larger texture. For example, in some embodiments, the plurality of light sources 111 may further include a fourth light source, a fifth light source, etc., and the fourth light source and the fifth light source may be lit according to the above-mentioned manners. All of these solutions can realize the recognition of a larger texture. For example, any one of the above solutions can form a complete texture image as shown in FIG. 7.

It should be noted that in some embodiments, a portion of the texture image obtained by lighting a part of the light sources in short time is sufficient to meet the requirement of texture recognition, so it is not necessary to form the complete texture image.

In the embodiments of the present disclosure, the light sources with a certain distance therebetween are lighted in the time-sharing manner according a certain rule as the photosensitive light sources of the image sensor array, so that the image sensor array can acquire a clear and accurate texture image in short time. In addition, overall recognition of a larger texture can be realized by lighting a plurality of light sources in a certain shape in a time-sharing manner.

In addition, it should be noted that in the embodiments of the present disclosure, the image sensors 121 and the controller 130 may be various forms, and no limitation is imposed to this in the embodiments of the present disclosure.

For example, in some embodiments, the sub-image sensors of each the image sensor 121 may be various suitable types of image sensors such as an image sensor of charge coupled device (CCD) type, an image sensor of complementary metal oxide semiconductor (CMOS) type, or a photodiode (e.g., PIN photodiode, etc.). According to needs, the image sensor 121 may sense only light of a certain wavelength (e.g., red light or green light), or may sense all visible light. For example, the image sensor array is attached to a side of the display panel 110 by an OCA adhesive.

For example, the controller 130 may be various types of integrated circuit chips with processing functions, which may have various computing architectures, such as a complex instruction set computer (CISC) architecture, a reduced instruction set computer (RISC) architecture, or a structure that implements a combination of a plurality of instruction sets. In some embodiments, the controller 130 is a microprocessor, such as an X86 processor or an ARM processor, or is a digital signal processor (DSP), a field programmable gate array (FPGA) chip, or the like.

For example, in some embodiments, the controller 130 further includes a memory, and the memory is configured to store a control program for lighting a plurality of light sources (or a plurality of pixel units) for forming a certain pattern, a control program for lighting a plurality of light sources in different regions in the time-sharing manner, and the like. For example, the memory is a storage medium of any form, such as a volatile memory or a nonvolatile memory, a semiconductor memory or a magnetic medium memory, and no limitation is imposed to this in the embodiments of the present disclosure.

For example, the texture recognition device provided by embodiments of the present disclosure may be implemented as electronic devices of various forms such as mobile phones, tablet computers, electronic books, etc.

At least one embodiment of the present disclosure provides an operation method of a texture recognition device, referring to the texture recognition device 100 of FIG. 1A-FIG. 1D, the operation method comprises: reading a signal of each of the image sensors through a plurality of signal switches for forming one image pixel of the texture image.

For example, in some embodiments, referring to FIG. 1B, each of the image sensors 121 includes a photosensor 122 and a plurality of signal switches electrically connected to the photosensor 122, for example, the signal switches are switch transistors 123, and the plurality of signal switches of each image sensor 121 are connected to a same texture collection line 124. In this case, the operation method further comprises: providing a driving signal to the plurality of signal switches of each image sensor 121 by the same texture collection line. In addition, the signal of each of the image sensors is used for forming one image pixel of the texture image.

Referring to FIG. 1C and FIG. 1D, each of the image sensors includes a plurality of sub-image sensors (four sub-image sensors shown in the figure), and the plurality of sub-image sensors are respectively driven. For example, each of the sub-image sensors includes a photosensor and a signal switch electrically connected to the photosensor. In this case, the operation method of the texture recognition device further includes: allowing a plurality of sub-signals of the plurality of sub-image sensors included in each of the image sensors to be superimposed for forming one image pixel of the texture image.

For example, in some embodiments, each of the image sensors comprises a plurality of sub-image sensors, each of the sub-image sensors comprises a photosensor and a signal switch electrically connected to the photosensor, in this case, the operation method of the texture recognition device further comprises: respectively outputting a plurality of sub-signals of the plurality of sub-image sensors comprised in each of the image sensors to a data output circuit, and then allowing the data output circuit to superimpose the plurality of sub-signals for forming one image pixel of the texture image. For example, referring to the above example as illustrated in FIG. 1C, which is not be repeated here.

For example, in some other embodiments, each of the image sensors comprises a plurality of sub-image sensors, each of the sub-image sensors comprises a photosensor and a signal switch electrically connected to the photosensor; in this case, the operation method of the texture recognition device further comprises: allowing a plurality of sub-signals of the plurality of sub-image sensors comprised in each of the image sensors to be superimposed, and then to be output to a data output circuit for forming one image pixel of the texture image. For example, referring to the above example as illustrated in FIG. 1D, which is not be repeated here.

For example, the plurality of sub-image sensors of each of the image sensors are arranged in an array of M×N; M and N are positive integers and at least one selected from a group consisting of M and N is larger than 1. The specific arrangement of the sub-image sensors can be seen in the above-mentioned embodiments and is not described here.

In the above embodiments, the signal amount in one image sensor can be released through four switch transistors. Compared with the case that the signal amount of one image sensor is released through one switch transistor, this solution can greatly improve the release speed of electrical signals and reduce the time of eliminating the afterimage. Therefore, when the image collection is performed in the time-sharing manner, the speed of the image collection is improved while ensuring the clarity and accuracy of the image collected.

For example, in some embodiments, referring to FIG. 2, the texture recognition device is, for example, a display device having an under-screen texture recognition function, and correspondingly includes a display panel including a pixel unit array, and the pixel unit array includes a plurality of pixel units. For example, the pixel unit array of the display panel is implemented as the light source array, and the plurality of pixel units are implemented to form the plurality of light sources. For example, each of the light sources includes one or more pixel units. In these embodiments, the operation method of the texture recognition device 100 further includes: lighting the one or more pixel units 103 of each of the plurality of light sources 111 to form a light source in a certain shape, such as a point light source, a linear light source, a Z-shaped light source or a light source in a shape of Chinese character "回". Specific descriptions can be referred to the above-mentioned embodiments, and are not repeated here.

For example, in some embodiments, referring to FIG. 4A, the plurality of light sources include at least one first light source and at least one second light source, the second light source is offset from the first light source by a first distance D1 in a first direction. In this case, the operation method of the texture recognition device 100 includes: lighting the first light source at a first moment and lighting the second light source at a second moment different from the first moment during the texture collection performed by the image sensor array 120.

For example, referring to FIG. 4B, an imaging range of the first light source on the image sensor array is in a first annular shape, and an imaging range of the second light source on the image sensor array 120 is in a second annular shape; the first annular shape does not overlap with the second annular shape or an area of an overlapping region of the first annular shape and the second annular shape is smaller than an interference threshold.

For example, in some embodiments, referring to FIG. 5A, the plurality of light sources further comprise at least one third light source, the third light source is offset from the first light source by a second distance D2 along the first direction, and the second distance D2 is smaller than the first distance D1. In this case, the operation method of the texture recognition device 100 includes: lighting the third light source at a third moment different from both the first moment and the second moment during the texture collection performed by the image sensor array 120, so that an imaging range of the third light source can supplement the imaging range of the first light source.

For example, referring to FIG. 5B, an imaging range of the first light source on the image sensor array 120 is in a first annular shape, an imaging range of the second light source on the image sensor array 120 is in a second annular shape, and an imaging range of the third light source on the image sensor array 120 is in a third annular shape; the third annular shape covers a ring center of the first annular shape, and the first annular shape does not overlap with the second annular shape, or an area of an overlapping region of the first annular shape and the second annular shape is smaller than the interference threshold.

For example, a time interval between the third moment and the first moment is larger than or equal to afterimage elimination time of the image sensors 121, thus the influence caused by the imaging afterimage of the first light source on the image sensors on the imaging of the third light source is eliminated. For example, the afterimage elimination time is determined by experiments or calculations in advance, so that the adverse effect caused by the afterimage is avoided by selecting an appropriate time interval between the third moment and the first moment. The determination of the afterimage elimination time may refer to the above-mentioned embodiments and is not be repeated here.

Similar to the above embodiments, in some embodiments, in order to obtain a larger texture image, for example, the operation method of the texture recognition device 100 further includes: during the texture collection performed by the image sensor array 120, controlling a plurality of first light sources arranged in a first pattern to be lit at a first moment, and controlling a plurality of second light sources arranged in a second pattern to be lit at a second moment, in which the second pattern is offset from the first pattern by the first distance D1 in the first direction.

Similarly, in some embodiments, for example, the operation method of the texture recognition device 100 further includes: controlling a plurality of third light sources in a third pattern to be lit at a third moment different from both the first moment and the second moment, in which the third pattern is offset from the first pattern by the second distance D2 along the first direction, and the second distance D2 is smaller than the first distance D1. Thus, a plurality of portions of the texture image obtained by the image sensor array 120 can complement each other to form a more complete texture image.

In the embodiments of the present disclosure, the shapes respectively formed by the plurality of first light sources, the plurality of second light sources, and the plurality of third light sources are not limited to the square described above, and may also be pentagonal, hexagonal, heptagonal, octagonal, circular, and the like as shown in FIG. 6A and FIG. 6B, for example. For example, the first light source, the second light source or the third light source are point light sources 1111 as shown in FIG. 6A or line light sources 1112 as shown in FIG. 6B. For example, in some embodiments, the operation method of the texture recognition device 100 further includes: lighting a plurality of light sources in a plurality of first patterns, a plurality of light sources in a plurality of second patterns, and a plurality of light sources in a plurality of third patterns, for example, lighting a plurality of light sources in the plurality of first patterns, a plurality of light sources in the plurality of second patterns, and a plurality of light sources in the plurality of third patterns that are arranged in an array, thereby realizing recognition of a larger texture. For example, in some embodiments, the plurality of light sources 111 further include a fourth light source, a fifth light source, etc., and the fourth light source and the fifth light source may be lit according to the above-mentioned manner. All of these solutions can realize the recognition of a larger texture. For example, any one of the above solutions can form a complete texture image as shown in FIG. 7.

It should be noted that in some embodiments, a portion of the texture image obtained by lighting a part of the light sources in short time is sufficient to meet the requirement of texture recognition, so it is not necessary to form the complete texture image.

In the embodiments of the present disclosure, the light sources with a certain distance therebetween are lighted in the time-sharing manner according a certain rule as the photosensitive light sources of the image sensor array, so that the image sensor array can acquire a clear and accurate texture image in short time. In addition, overall recognition of a larger texture can be realized by lighting a plurality of light sources in a certain shape in a time-sharing manner.

In addition, it should be noted that in the embodiments of the present disclosure, the image sensor 121 may adopt various forms, specifically referring to the above embodiments, no limitation is imposed to this in the embodiments of the present disclosure.

The following should be noted:

(1) The accompanying drawings involve only the structure(s) in connection with the embodiment(s) of the present disclosure, and other structure(s) can be referred to common design(s).

(2) For clarity, in accompanying drawings for illustrating the embodiment(s) of the present disclosure, the thickness of a layer or a structure may be enlarged or reduced. However, it should be understood that, in the case in which a component or element such as a layer, film, area, substrate or the like is referred to be "on" or "under" another component or element, it may be directly on or under the another component or element or a component or element is interposed therebetween.

(3) In case of no conflict, embodiments of the present disclosure and the features in the embodiments may be mutually combined to obtain new embodiments.

What have been described above are only specific implementations of the present disclosure, the protection scope of the present disclosure is not limited thereto. The protection scope of the present disclosure should be based on the protection scope of the claims.

What is claimed is:

1. A texture recognition device, comprising:
a light source array comprising a plurality of light sources; and
an image sensor array at a side of the light source array and comprising a plurality of image sensors, wherein the plurality of image sensors are configured to receive light emitted from the plurality of light sources and reflected to the image sensors by a texture for a texture image collection,
wherein each of the image sensors comprises a plurality of signal switches, and a signal of each of the image sensors is read through the plurality of signal switches for forming one image pixel of the texture image;
the texture recognition device further comprises a controller,
the plurality of light sources comprise at least one first light source and at least one second light source, and the second light source is offset from the first light source by a first distance along a first direction;
the controller is configured to control the first light source to be lit at a first moment and control the second light source to be lit at a second moment different from the first moment during the texture image collection performed by the image sensor array,
wherein an imaging range of the first light source on the image sensor array is in a first annular shape, and an imaging range of the second light source on the image sensor array is in a second annular shape; the first annular shape does not overlap with the second annular shape or an area of an overlapping region of the first annular shape and the second annular shape is smaller than an interference threshold.

2. The texture recognition device according to claim 1, wherein each of the image sensors comprises a photosensor and the plurality of signal switches electrically connected to the photosensor; and
the plurality of signal switches are connected with a same texture collection line.

3. The texture recognition device according to claim 1, wherein the light source comprises a point light source, a linear light source, a Z-shaped light source or a light source in a shape of Chinese character " "回". ".

4. The texture recognition device according to claim 1, further comprising a display panel, wherein the display panel comprises a pixel unit array,
the pixel unit array comprises a plurality of pixel units; and
the pixel unit array comprises the light source array, and each of the plurality of light sources comprises one or more pixel units of the plurality of pixel units.

5. The texture recognition device according to claim 4, wherein each of the light sources comprises at least two pixel units,
wherein where the at least two pixel units comprised in each of the light sources are arranged to form a point light source, the at least two pixel units comprised in each of the light sources are configured to be lit alternately.

6. The texture recognition device according to claim 4, wherein the display panel comprises an organic light-emitting diode display panel or a quantum dot light-emitting diode display panel.

7. The texture recognition device according to claim 1, wherein the plurality of light sources further comprise at least one third light source, the third light source is offset from the first light source by a second distance along the first direction, and the second distance is smaller than the first distance;
the controller is further configured to control the third light source to be lit at a third moment different from both the first moment and the second moment during the texture image collection performed by the image sensor array,
wherein a time interval between the third moment and the first moment is larger than or equal to afterimage elimination time of the image sensors; and
an imaging range of the third light source on the image sensor array is in a third annular shape, and the third annular shape covers a ring center of the first annular shape.

8. The texture recognition device according to claim 1, wherein the controller is further configured to control a plurality of first light sources arranged in a first pattern to be lit at the first moment, and control a plurality of second light sources arranged in a second pattern to be lit at the second moment during the texture image collection performed by the image sensor array,
wherein the second pattern is offset from the first pattern by the first distance along the first direction.

9. A texture recognition device, comprising:
a light source array comprising a plurality of light sources; and
an image sensor array at a side of the light source array and comprising a plurality of image sensors, wherein the plurality of image sensors are configured to receive light emitted from the plurality of light sources and reflected to the image sensors by a texture for a texture image collection,
wherein each of the image sensors comprises a plurality of signal switches, and a signal of each of the image sensors is read through the plurality of signal switches for forming one image pixel of the texture image,
wherein each of the image sensors comprises a plurality of sub-image sensors, each of the sub-image sensors comprises a photosensor and a signal switch electrically connected to the photosensor,
wherein a plurality of sub-signals of the plurality of sub-image sensors comprised in each of the image sensors are respectively output to a data output circuit through signal switches of the plurality of sub-image sensors, and then the data output circuit superimposes the plurality of sub-signals to obtain a signal of each of the image sensors for forming one image pixel of the texture image, or
a plurality of sub-signals of the plurality of sub-image sensors comprised in each of the image sensors are respectively output through the signal switches of the plurality of sub-image sensors and then are superimposed to obtain a signal of each of the image sensors, and then the signal of each of the image sensors obtained by superposition is output to a data output circuit for forming one image pixel of the texture image.

10. The texture recognition device according to claim 9, wherein the plurality of sub-image sensors of each of the image sensors are arranged in an array of M×N, wherein M and N are positive integers and at least one selected from a group consisting of M and N is larger than 1.

11. The texture recognition device according to claim 9, wherein each of the image sensors comprises a plurality of sub-image sensors, each of the sub-image sensors comprises a photosensor and a signal switch electrically connected to the photosensor,
wherein a plurality of sub-signals of the plurality of sub-image sensors comprised in each of the image sensors are respectively output through the signal switches of the plurality of sub-image sensors and then are superimposed to obtain a signal of each of the image sensors, and then the signal of each of the image sensors obtained by superposition is output to a data output circuit for forming one image pixel of the texture image.

12. The texture recognition device according to claim 9, wherein the plurality of sub-image sensors of each of the image sensors are arranged in an array of M×N, wherein M and N are positive integers and at least one selected from a group consisting of M and N is larger than 1.

13. The texture recognition device according to claim 9, further comprising a controller,
wherein the plurality of light sources comprise at least one first light source and at least one second light source, and the second light source is offset from the first light source by a first distance along a first direction;
the controller is configured to control the first light source to be lit at a first moment and control the second light source to be lit at a second moment different from the first moment during the texture image collection performed by the image sensor array,
wherein an imaging range of the first light source on the image sensor array is in a first annular shape, and an imaging range of the second light source on the image sensor array is in a second annular shape; the first annular shape does not overlap with the second annular shape or an area of an overlapping region of the first annular shape and the second annular shape is smaller than an interference threshold.

14. The texture recognition device according to claim 13, wherein the plurality of light sources further comprise at least one third light source, the third light source is offset from the first light source by a second distance along the first direction, and the second distance is smaller than the first distance;
the controller is further configured to control the third light source to be lit at a third moment different from both the first moment and the second moment during the texture image collection performed by the image sensor array,
wherein a time interval between the third moment and the first moment is larger than or equal to afterimage elimination time of the image sensors; and
an imaging range of the third light source on the image sensor array is in a third annular shape, and the third annular shape covers a ring center of the first annular shape.

15. An operation method of a texture recognition device, wherein the texture recognition device comprises:
a light source array comprising a plurality of light sources; and
an image sensor array at a side of the light source array and comprising a plurality of image sensors, wherein the plurality of image sensors are configured to receive light emitted from the plurality of light sources and reflected to the image sensors by a texture for a texture image collection, and each of the image sensors comprises a plurality of signal switches; and
the operation method comprises:
reading a signal of each of the image sensors through the plurality of signal switches for forming one image pixel of the texture image;
the plurality of light sources comprise at least one first light source and at least one second light source, and the second light source is offset from the first light source by a first distance along a first direction; and
the operation method further comprises:
lighting the first light source at a first moment and lighting the second light source at a second moment different from the first moment during the texture image collection performed by the image sensor array,
wherein an imaging range of the first light source on the image sensor array is in a first annular shape, and an imaging range of the second light source on the image sensor array is in a second annular shape; the first annular shape does not overlap with the second annular shape or an area of an overlapping region of the first annular shape and the second annular shape is smaller than an interference threshold.

16. The operation method according to claim 15, wherein each of the image sensors comprises a photosensor and the plurality of signal switches electrically connected to the photosensor, and
the operation method further comprises:
providing a driving signal to the plurality of signal switches of each of the image sensors by a same texture collection line.

17. The operation method according to claim 15, wherein each of the image sensors comprises a plurality of sub-image sensors, each of the sub-image sensors comprises a photosensor and a signal switch electrically connected to the photosensor; and
the operation method further comprises:
respectively outputting a plurality of sub-signals of the plurality of sub-image sensors comprised in each of the image sensors to a data output circuit, and then allowing the data output circuit to superimpose the plurality of sub-signals for forming one image pixel of the texture image.

18. The operation method according to claim 15, wherein each of the image sensors comprises a plurality of sub-image sensors, each of the sub-image sensors comprises a photosensor and a signal switch electrically connected to the photosensor; and
the operation method further comprises:
allowing a plurality of sub-signals of the plurality of sub-image sensors comprised in each of the image sensors to be superimposed, and then to be output to a data output circuit for forming one image pixel of the texture image.

19. The operation method according to claim 15, wherein the texture recognition device comprises a display panel, the display panel comprises a pixel unit array, and the pixel unit array comprises a plurality of pixel units;
the pixel unit array comprises the light source array, and each of the plurality of light sources comprises one or more pixel units of the plurality of pixel units; and
the operation method further comprises:
lighting the one or more pixel units of the plurality of pixel units of each of the plurality of light sources to form a point light source, a linear light source, a Z-shaped light source or a light source in a shape of Chinese character " "回".".

20. The operation method according to claim 15, wherein the texture recognition device comprises a display panel, the display panel comprises a pixel unit array, and the pixel unit array comprises a plurality of pixel units;
the light source array comprises the pixel unit array, and each of the plurality of light sources comprises at least two pixel units for forming a point light source; and
the operation method further comprises:
lighting the at least two pixel units for forming the point light source alternately.

21. The operation method according to claim 15, wherein the plurality of light sources further comprise at least one third light source, the third light source is offset from the first light source by a second distance along the first direction, and the second distance is smaller than the first distance; and
the operation method further comprises:
lighting the third light source at a third moment different from both the first moment and the second moment during the texture image collection performed by the image sensor array,
wherein a time interval between the third moment and the first moment is larger than or equal to afterimage elimination time of the image sensors; and
an imaging range of the third light source on the image sensor array is in a third annular shape, and the third annular shape covers a ring center of the first annular shape.

* * * * *